Sept. 11, 1951 C. E. WARREN ET AL 2,567,833
PIPE CUTTER
Filed Sept. 4, 1948 2 Sheets-Sheet 1

INVENTORS
Chester E. Warren
Edwin A. Morris
BY
Kenyon & Kenyon
ATTORNEYS

INVENTORS.
Chester E. Warren
Edwin A. Morris
BY
Kenyon & Kenyon
ATTORNEYS

Patented Sept. 11, 1951

2,567,833

UNITED STATES PATENT OFFICE 2,567,833

PIPE CUTTER

Chester E. Warren and Edwin A. Morris, Lyons, Kans.

Application September 4, 1948, Serial No. 47,898

2 Claims. (Cl. 30—97)

This invention relates to a pipe cutter of a circumferentially cutting type including an annular base adapted to encircle the pipe to be cut and carrying clamping elements for clamping it non-rotatively to the pipe, with an annular rotor rotatively mounted by this base and which is also adapted to encircle the pipe, but which carries at least one cutting tool adapted to work inwardly against the pipe. This pipe cutter also includes apparatus for transmitting rotative force to the rotor from the annular base, the latter thereby transmitting the reaction to the pipe itself. Thus the device may be a self-contained unit which may be used to cut the pipe circumferentially without the need of other apparatus such as a pipe clamp or vise which might otherwise be required to hold the pipe against rotating with the cutting tool.

One object is to provide a device of the above type which may be applied transversely to the pipe as contrasted to being threaded or passed necessarily over a free pipe end. This permits the device to be used in the case of installed pipes having no free end and to be used wherever transverse application is more convenient.

Another object is to provide an interconnection for the annular base and the annular rotor which firmly and ruggedly rotatively interconnects these parts. Still another object is to provide a construction attaining the first and second named objects simultaneously. A further object is to provide a pipe cutter of the type described and which readily permits the device to work with a relatively large range of pipe sizes. Other and further objects include the provision of a simple feeding device or arrangement for automatically feeding the cutting tool or tools radially inwardly as the rotor turns during pipe cutting operation, to provide a device which may be easily disassembled for cleaning or repair of its various parts, and in general to provide a better pipe cutter of the described type than has heretofore been made possible by the prior art teachings.

A specific example of a pipe cutter embodying the principles of the present invention is illustrated by the accompanying drawings, in which.

Figure 1:
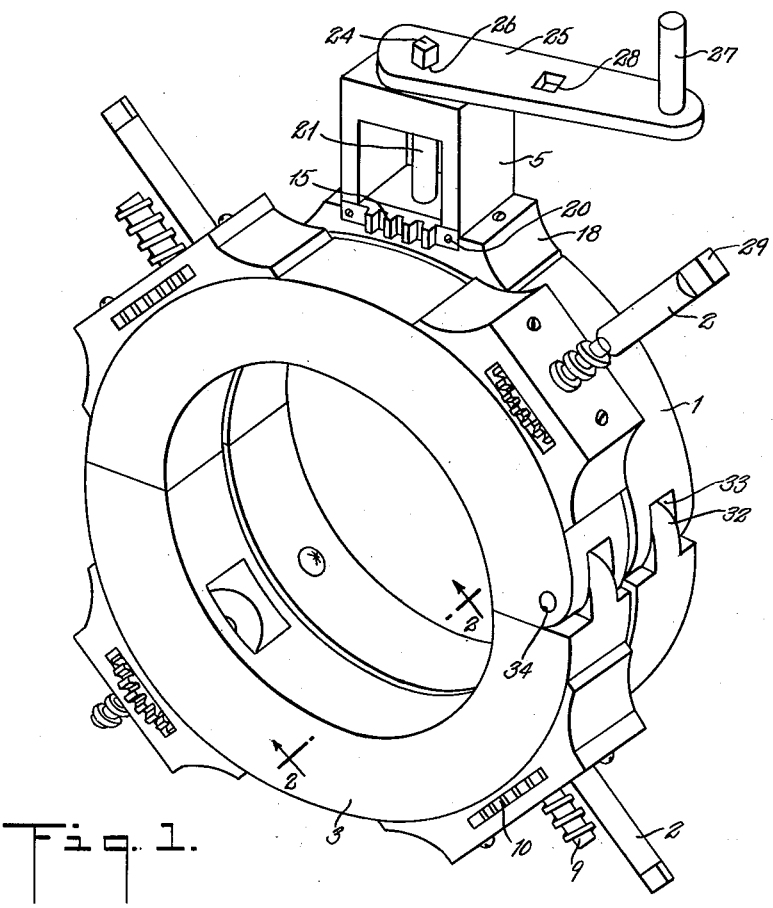
Fig. 1 is an isometric view of this pipe cutter.

Having reference to these drawings, the illustrated pipe cutter features a radially separable, multi-part, annular base 1 adapted to encircle the pipe to be cut and carrying clamping elements 2 for clamping it non-rotatively to this pipe, and a radially separable multi-part annular rotor 3 rotatively mounted by or connected with the base and which is substantially concentric therewith and which is also adapted to encircle the pipe, but which carries at least one cutting tool 4 adapted to work inwardly against the pipe and peripherally or circumferentially cut it upon rotation of the rotor 3. Apparatus 5 is provided on the base 1 for applying rotative force to the rotor 3 with the base 1 transmitting the reaction to the pipe itself, and the device includes locking elements 6 for locking the mount 1 and rotor 3 against radial separation of their respective parts. Thus the mount 1 and rotor 3 are adapted for transverse application to the pipe when their respective parts are radially separated. The device does not need to be threaded or passed over a free pipe end.

The rotor 3 is illustrated as carrying four of the pipe cutting tools 4. In each instance, the rotor 3 provides a radial guideway 7 going completely through the rotor, the latter being in the form of a ring. The cutter 4 is a rotary or wheel type cutter and is journaled by a carriage 8 reciprocatively sliding in the guideway 7. The carriage 8 has an outwardly projecting screw 9 in screw-threaded engagement with a nut 10, and is provided with thrust bearing surfaces 11 for restraining it from material radial displacement respecting the rotor 3. The thrust bearing surfaces 11 are provided by the opposed faces of a transverse slot 12 formed in a cap 13 fastened to the rotor 3 at the outer end of the guideway 7, by machine screws 14. This cap 13 is apertured to provide clearance for the screw 9 and its inner face otherwise closes the outer end of the guideway 7. This assembly is provided in the case of each of the cutting tools 4.

A tool feeding screw radially arranged respecting the rotor 3 is provided by the screw 9, in each instance, and the nut 10 is in the form of a wheel in which the screw 9 is threaded. The peripheral surface of the nut 10 is formed with gear teeth so that the nut is in effect a pinion. In each instance the nut 10 travels through an orbit as the rotor 3 rotates, and by providing the base 1, which is in effect a stator, with a tangentially arranged short rack gear 15 adapted for intermeshing with this pinion and positioned in line with its orbital path, it is possible to successively feed the cutters 4 radially inwardly, in each instance, as the rotor rotates. Thus, in each instance, as the rotor rotates the pinion nuts 10 successively mesh momentarily with the rack gear 15 which is stationary since it is carried by or fixed to the base 1 non-rotatively clamped to the pipe being cut. Each time this occurs the pinion nut is partially turned so as to screw in the screw 9 which it engages. The amount of inward feed is determined by the length of the rack gear 15, the diameter of the pinion nut and the radius of its orbital travel, and the pitch of the threads of the nut and screw. Since rather minute incremental feeding of the cutting tools is desirable, this rack 15 may be made so short that it can be straight, as contrasted to being formed about an arc concentric with the axis of the device.

As shown by the drawings, the annular base 1 and the annular rotor 3 have axially abutting faces 1a and 3a which must be held together rotatively by an annular bearing capable of resisting axial thrust which might otherwise separate the two annular parts. This bearing is finished by providing the face 1a with an undercut annular groove 16 and by providing the face 3a with an annular tongue 17 having an enlarged end 17a, with this tongue riding in the groove 16 with its end 17a retained beneath the undercut sides of the groove 16. In other words, the axially abutting faces 1a and 3a are interfastened by axially cooperating, interkeying annular tongue and groove surfaces provided around the faces 1a and 3a. The tongue and groove surfaces are interrupted at the junctions between the separate parts of the base 1 and rotor 3. Preferably the tongue and groove surfaces are integral parts of the base and rotor respectively. Substantially concentric respective rotation between the base 1 and rotor 3 is effected by making the tongue and groove surfaces concentric with these assemblies and the latter are preferably mutually concentric. The tongue is illustrated as having a T-shaped cross section and the groove as being correspondingly shaped. Preferably the tongue and groove interfit in a precision manner so that there is relatively little play between them other than rotatively. The surfaces 1a and 3a may be finished to provide bearing surfaces, with the tongue top surfaces and the undercut faces of the groove providing the other oppositely working bearing surfaces, if desired.

Manual powering of the rotor 3 is contemplated in the case of the device illustrated. Thus the part indicated at 5 and previously referred to simply as apparatus for applying rotative force to the rotor 3, is actually a radially projecting frame extending from and secured to or integral with a cap 18 that is fastened to the outer periphery of the rotor 1 by machine screws 19. This frame 5 may also serve to mount the gear rack 15, the latter being shown as screwed to its side facing the rotor 3, by countersunk machine screws 20. The frame 5 functions as a driving apparatus since it journals a drive shaft 21 radially of the base 1 and which has a pinion 22 on its lower end and meshing with a ring gear 23 positioned for this purpose on the face 3a of the rotor 3. Thus by turning the drive shaft 21, the pinion 22 is turned so as to drive the ring gear 23 formed in the face 3a and hence rotate the rotor 3.

Reference to the drawings shows that the ring gear 23 is an axially facing ring gear and that it is concentrically fixed to the rotor at a location free from the previously mentioned tongue and groove bearing connection, being shown with a relatively larger radius, and the ring gear faces the base 1. The ring gear may be formed integrally with the rotor 3 or it may comprise a removable part so it may be replaced when necessary. In any event, it must be a multi-part ring gear with its parts coinciding with those of the multi-part base 1 and multi-part rotor 3.

The outer end of the shaft 21 is provided with a squared end 24 and this end is furnished with a removable crank 25 provided with a squared hole 26 fitting the shaft end 24 for this purpose. The other end of the crank has a handle 27 for manual operation. Preferably, this crank is provided with a second squared hole 28 which is closer to the handle, and this hole may be used on the squared end 24 for the purpose of rotation of the rotor 3 so as to rapidly move the various tools to their starting positions.

Preferably, the clamping elements 2, previously mentioned, are in the form of screws, four screws being illustrated, which are arranged radially through correspondingly threaded holes in the mount 1 and which are provided with squared ends 29 of the same size and shape as the end 24 of the drive shaft 21. When this is done the crank 27 may be used to run the screws 29 in or out when it is desired to clamp or unclamp the cutter respecting a pipe.

When the screws 14 are removed the caps 13 may be removed so as to withdraw the cutters 4 from the guideways 7, and by manually turning the wheel or pinion nuts 10 complete disassembly becomes possible. By removing the screws 19, the cap 18 may be removed so as to gain access to the pinion 22. Incidentally, the lower end of the drive shaft 21 may be journaled in a hole 30 sunk radially inwardly from the outside of the base 1 with the latter having an axially extending slot 31 providing clearance for the pinion 22. The lower end of the shaft 21 may also be journaled by the frame 5 immediately above the pinion 22 whereby to provide a straddle bearing for the latter. Removal of the cap 18 permits disassembly of all of these parts. The upper end of the shaft 21 is shown as journaled by the upper end of the frame 5. It is obvious that there is little chance for deflection of either the shaft 21 or the pinion 22 when driving force is applied during the pipe cutting operation. Therefore, easy and smooth operation is effected.

It has previously been mentioned at various places herein that the base 1 and rotor 3 are multi-part elements. Also that they are radially separable. Actually, these elements are each shown in the form of two parts, each being radially split at diametric locations free from the cutting tool locations, the clamping elements and the driving apparatus. The annular rotary bearing that interconnects the two elements are corresponding multi-part assemblies. This naturally follows when they are machined integrally from the base 1 and rotor 3, and if they comprise separate parts they must be made in the same fashion. These comments are also applicable to the axially facing ring gear which must be a corresponding multi-part assembly.

Now, with the above in mind, it is important to note that the present invention provides a mechanism including, in combination, two annular members, which are the elements 1 and 3, having axially abutting faces 1a and 3a interfastened by axially cooperating, interkeying annular tongue and groove surfaces 16 and 17 provided around the faces 1a and 3a, with these members, and these faces and these surfaces, all being in the form of corresponding multi-part assemblies.

With the above in mind, when all the respective parts are mutually registered by relative rotation of the base member 1 and the rotor member 3, it becomes possible to radially separate the parts. This permits the pipe cutter to be transversely applied to the pipe, when the parts are brought together and clamped against radial separation, the device functions as a pipe cutter of the type described, just as though the annular members were circumferentially solid.

Preferably, the base member and the rotor, each has its two parts hinged at one end and provided with means for clamping the other ends together. As illustrated, each may be provided at the hinging ends of its parts with a hinge by providing one of the parts with a circumferentially extending tongue 32, and the other part with a circumferentially extending slot 33 into which this tongue 32 fits, with both ends provided with registered holes passing through the tongue 32 and through which a hinge pin 34 is passed axially of the cutter. The tongue 32 is preferably positioned near the outer periphery of the parts and the various corners may be rounded as required for clearance to permit the hinging action. This same construction may be applied individually to the base 1 and rotor 3.

The locking elements 6, previously noted, may comprise links that are spaced axially respecting the element and which are hinged to one of its parts by a hinge pin 35 with the other or swinging ends of these rings supporting a transverse pin 36 on which a toggle member 37 swings, the swinging end of the opposite part of the element providing a saddle 38 for cooperation with the toggle element 37. The specific construction illustrated is sometimes referred to as a boomer link connection. The swinging end of the toggle element 37 may be provided with a finger ring 39 for convenience.

The various clamping parts are preferably designed to hug the periphery of the element with which they are used, and so as to project radially from it no farther than necessary.

The described hinging and clamping arrangements are applied to the base 1 and rotor 3 in each instance. No means is required to clamp the ring gear parts together since they are carried firmly by the parts of the rotor 3.

Operation of the disclosed pipe cutter is effected by first reversely rotating the drive shaft 21 to run out the cutting tools if they are not already far enough out to clear the pipe to be cut. Also, the clamping screws 2 are run out far enough to clear the pipe. These operations may be effected by appropriate use of the crank 25. If any special feeding progression of the various cutting tools is desired, the nuts 10 may be individually rotated with this in mind, their toothed peripheries being exposed and accessible for finger turning, if this is desired. Preferably the tools are adjusted to equal distances from the axis of the cutter. Next the rings 39 are pulled to trip down the toggle elements 37 in each instance so that the links 6 may be swung outwardly and the parts of the base 1 and rotor 3 radially separated by swinging action about the hinge pin 34.

Separating action is obtained simply by making certain that the tongue and groove surfaces are relatively turned to positions causing their radial lines of separation to coincide or register. The parts may be provided with registering indicia to aid in this operation, or proper registration may be determined by registering the hinge and clamping elements, or simply by slightly turning the crank 25 until the parts separate, the clamping elements having, of course, been previously released.

With the parts radially separated, the device may be applied to any pipe within the size range of the device. Since transverse application is possible it does not matter whether the pipe has an accessible free end.

The next operation is simply to close the parts and reapply the clamping elements so as to lock them in position. After this is done the clamp nuts 2 are run in, which may be easily done by using the crank 25 in the case of the illustrated arrangement, and by thereafter applying the crank 25 to the squared end 24 of the drive shaft 21 and turning the crank in the appropriate direction for feeding the cutting tools inwardly.

As the rotor 3 rotates the various pinion nuts 10 orbitally travel past and mesh with the short gear rack 15 secured to the frame 5 mounted by the base 1. The teeth on the pinion nuts and the rack may be made to fit loosely enough so the arcuate travel of the former does not cause jamming on the straight rack. But the rack could be curved concentrically with the pinion nuts' travel, if desired. Each time this occurs each pinion nut is turned a partial revolution so as to screw in the screw 9 mounting the cutting tool 4. The nuts act as feeders or feeding controllers and the rack as an operator therefor. Thus the cutting tools are incrementally and progressively fed intermittently inwardly so that the cutting action proceeds smoothly and progressively until the pipe is ultimately cut.

In addition to the easy disassembly of the parts previously noted, it should also be noted that the assemblies themselves may be easily separated from each other. This may be done simply by removing the hinge pin 34 and separating completely the coinciding parts of the assemblies, and then rotating them relatively to disconnect the tongue and groove surfaces.

A device of the character under disclosure is frequently used in the field, and these various disassembly features are of great advantage in connection with cleaning and repair work. Reassembly is equally easy as is relatively obvious.

Figure 3:
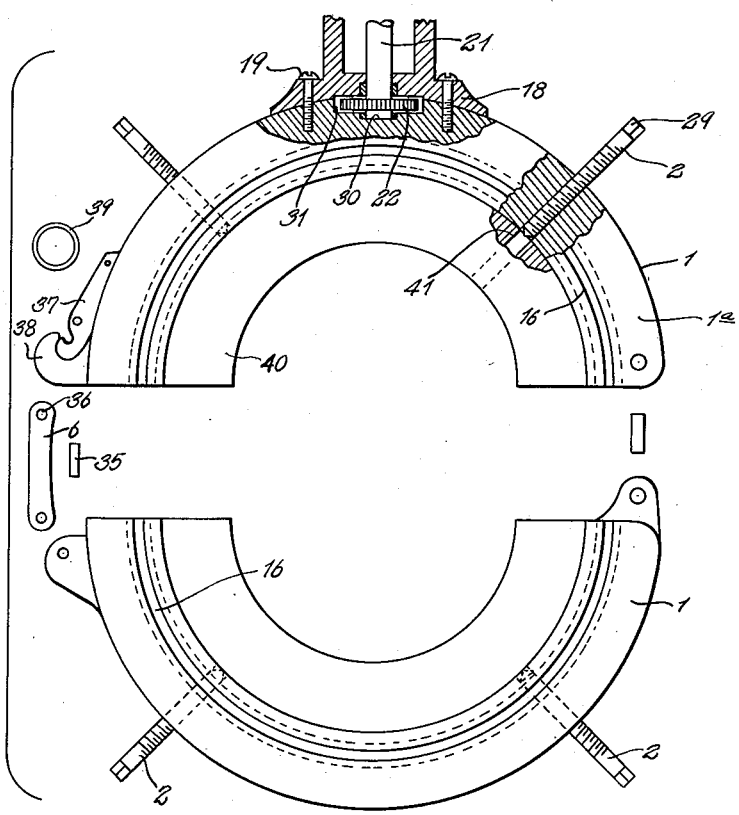
Fig. 3 is a view of the rotor-facing side of the base, partly sectioned and exploded, and also shows a multi-part shim used when required for cutting tool setting and also for cutting smaller pipe sizes.
Figure 4:
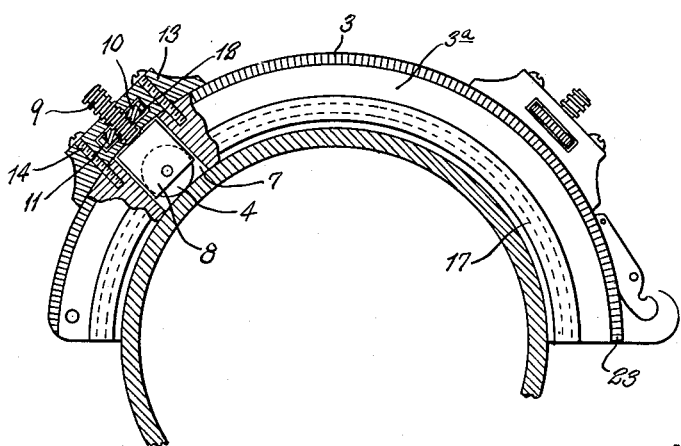
Fig. 4 is a view of the base-facing side of one part of the multi-part rotor, the other part being substantially identical therewith.

Accuracy and convenience in setting the various cutting tools concentrically respecting the axis of the device, prior to the start of cutting operation, is provided by the multi-part shims, of which one is illustrated by Fig. 3 of the drawings. These shims 40 may be made as radially split semi-circular rings and provided with radial holes 41 through which the clamping screws 2 of the base 1 may pass. The shim sizes should correspond to standard pipe sizes. The outer peripheries of the shims should fit the inner periphery of the base, the intercontacting surfaces being preferably machined to provide precision fits. The inside diameters of the shims should be just sufficient to fit the corresponding pipe sizes with perhaps a little clearance to provide for corrosion usually found on exposed pipes. The shims are multi-part assemblies so they may be applied to a pipe in the same manner as the pipe cutter. If necessary, a set of the screws 2 that are longer may be provided for substitution when necessary.

In use, one of these multi-part shims is applied to the pipe, a shim being used having an inside diameter corresponding to that of the pipe. Then the pipe cutter is applied so the inside of the base engages the outside of the shim, and the clamping screws 2 are run in to clamp the pipe. Then it is possible to manually run in each of the cutting tools, by rotation of the respective wheel or pinion nuts 10, to make the cutting tools touch the periphery of the pipe. When all the tools touch, concentricity of the tools is obtained and the cutter is ready to cut the pipe. The shims may be retained in position during the cutting of the pipe.

Figures 2, 5:
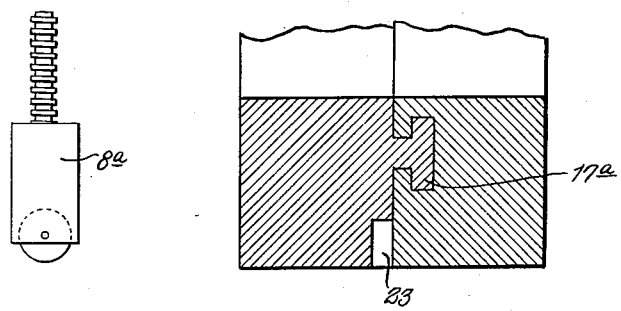
Fig. 2 is a cross section taken from the line 2—2 in Fig. 1.
Fig. 5 shows one of a group of cutting tool assemblies which may be substituted for those shown by Fig. 4 when cutting a smaller sized pipe.

Since the use of the shims makes the pipe cutter stable when used with even a rather small diametered pipe, the pipe cutter is made applicable for use with a large range of pipe sizes by the use of a corresponding range of shim sizes. The device may be provided with a plurality of groups of cutting tool assemblies, each comprising the tool 4, the carriage 8 and the screw 9, but with the groups each providing carriages 8 of varying lengths as required for the cutting tools 4 to work against the smaller pipes without the carriages leaving the guideways 7. Thus, Fig. 5 of the drawings shows a longer size of carriage, in addition to the size shown in use by the device, the carriage 8a being longer than the carriage 8. If the device uses four tools, four of such cutting tool assemblies should be provided. Due to the disassembly advantages of the device the various groups of cutting assemblies, intended for the various ranges of pipe sizes, may be easily substituted for each other whenever necessary. The substitution of the shims of varying sizes is also easily carried out. None of these parts are fragile or easily put out of operation, yet they permit the pipe cutter to be a universal device capable of handling a wide variety of pipe sizes.

We claim:

1. A pipe cutter including in combination a pipe clamping ring that is radially split into radially separable segments, a pipe cutter carrying ring that is radially split correspondingly to said clamping ring into radially separable segments corresponding to those of said clamping ring, said rings being positioned beside each other and having axially facing mutually opposed faces, one of the latter having an annular undercut groove and the other having an annular tongue with an enlarged end and with said tongue and groove interfitting to hold said rings together against axial separation while said carrying ring rotates relative said clamping ring, said corresponding segments being radially separable simultaneously when mutually registered with their tongue and groove portions holding them against relative axial separation, a pair of independent hinges, one joining the segments of said clamping ring and the other the segments of said carrying ring, said hinges having their pintles extending axially and spaced equal distances in a radial direction from the central axis of said pipe cutter, whereby said pintles may be aligned to permit simultaneous opening and closing of said clamping ring and said carrier ring when said pintles are aligned and releasable means for fastening the segments of said rings together independently respecting each ring to permit respective rotation of the latter.

2. A pipe cutter including in combination a pipe clamping ring that is radially split into radially separable segments, a pipe cutter carrying ring that is radially split correspondingly to said clamping ring into radially separable segments corresponding to those of said clamping ring, said rings being positioned beside each other and having axially facing mutually opposed faces, one of the latter having an annular undercut groove and the other having an annular tongue with an enlarged end and with said tongue and groove interfitting to hold said rings together against axial separation while said carrying ring rotates relative said clamping ring, said corresponding segments being radially separable simultaneously when mutually registered with their tongue and groove portions holding them against relative axial separation, hinges interhinging the segments of the respective rings together so said corresponding segments radially separate by swinging apart with said hinges on the respective rings relatively independent so said rings may relatively rotate, and releasable locks locking the corresponding swinging ends of the segments of the respective rings together with said locks on the respective rings relatively independent so said rings may relatively rotate, the corresponding hinges on the respective rings having swinging axes extending axially of said pipe cutter and being spaced equal radial distances from the central axis of said pipe cutter so that said swinging axes may be registered and aligned so said corresponding segments may swing radially apart simultaneously when said locks are released and said corresponding segments are mutually registered.

CHESTER E. WARREN.
EDWIN A. MORRIS.

REFERENCES CITED

The following references are of record in the file of this patent:

UNITED STATES PATENTS

| Number | Name | Date |
| --- | --- | --- |
| 29,602 | Kenyon | Aug. 14, 1860 |
| 760,128 | Jackson | May 17, 1904 |
| 1,115,277 | Bodkin | Oct. 27, 1914 |
| 1,155,136 | Dies | Sept. 28, 1915 |
| 1,206,311 | Dillinger | Nov. 28, 1916 |
| 2,421,332 | Johnson | May 27, 1947 |